(12) United States Patent
Xiang et al.

(10) Patent No.: US 12,511,000 B2
(45) Date of Patent: Dec. 30, 2025

(54) TOUCH DISPLAY SUBSTRATE, APPARATUS AND MANUFACTURING METHOD WITH CONSTANT VOLTAGE SIGNAL LINES BETWEEN TOUCH AND DISPLAY LAYERS

(71) Applicant: BOE Technology Group Co., Ltd., Beijing (CN)

(72) Inventors: Dalin Xiang, Beijing (CN); Shiming Shi, Beijing (CN); Zewen Bo, Beijing (CN); Lian Xiang, Beijing (CN); Lina Liu, Beijing (CN); Yuanyuan Li, Beijing (CN); Meizhu Zheng, Beijing (CN); Mengyang Wen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/292,509

(22) PCT Filed: Aug. 15, 2022

(86) PCT No.: PCT/CN2022/112349
§ 371 (c)(1),
(2) Date: Jan. 26, 2024

(87) PCT Pub. No.: WO2023/020409
PCT Pub. Date: Feb. 23, 2023

(65) Prior Publication Data
US 2025/0085821 A1 Mar. 13, 2025

(30) Foreign Application Priority Data

Aug. 16, 2021 (CN) .......................... 202110937059.3

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 3/0446* (2019.05);
(Continued)

(58) Field of Classification Search
CPC .... G06F 3/0445; G06F 3/0446; G06F 3/0412; G06F 2203/04103; G06F 2203/04107; G06F 2203/0411; G06F 2203/04112
See application file for complete search history.

(56) References Cited

U.S. PATENT DOCUMENTS

2020/0125202 A1* 4/2020 Li .......................... H10K 59/40
2021/0026489 A1* 1/2021 Lee ......................... G06F 3/047
(Continued)

FOREIGN PATENT DOCUMENTS

CN 101320310 A 12/2008
CN 101908314 A 12/2010
(Continued)

*Primary Examiner* — Liliana Cerullo
(74) *Attorney, Agent, or Firm* — Nath, Goldberg & Meyer; Joshua B. Goldberg

(57) ABSTRACT

A touch display substrate, a method for manufacturing a touch display substrate and a display apparatus are provided. The touch display substrate includes a base substrate; at least one touch electrode, which includes a plurality of touch signal lines extending in preset directions, and the plurality of touch signal lines form a mesh structure; display signal lines on the base substrate and electrically connected to display pixels for providing display signals thereto; second signal lines electrically connected to a constant potential terminal, and between a layer of the touch signal lines and a layer of the display signal lines. Orthographic projections of the second signal lines on the base substrate at least partially overlap with those of at least some touch signal lines; and/or orthographic projections of the second signal (Continued)

lines on the base substrate at least partially overlap with those of at least some display signal lines.

11 Claims, 7 Drawing Sheets

(52) U.S. Cl.
CPC ............. *G06F 2203/04103* (2013.01); *G06F 2203/04107* (2013.01); *G06F 2203/04111* (2013.01); *G06F 2203/04112* (2013.01)

(56) References Cited

U.S. PATENT DOCUMENTS

| | | | |
|---|---|---|---|
| 2023/0004253 A1* | 1/2023 | Shin | G06F 3/0446 |
| 2025/0021199 A1* | 1/2025 | Wen | G06F 3/041 |

FOREIGN PATENT DOCUMENTS

| | | |
|---|---|---|
| CN | 102621729 A | 8/2012 |
| CN | 104536635 A | 4/2015 |
| CN | 106293206 A | 1/2017 |
| CN | 112527159 A | 3/2021 |
| JP | 2015152946 A | 8/2015 |

* cited by examiner

TOUCH DISPLAY SUBSTRATE, APPARATUS AND MANUFACTURING METHOD WITH CONSTANT VOLTAGE SIGNAL LINES BETWEEN TOUCH AND DISPLAY LAYERS

This is a National Phase Application filed under 35 U.S.C. 371 as a national stage of PCT/CN2022/112349, filed Aug. 15, 2022, an application claiming the benefit of Chinese Application No. 202110937059.3, filed Aug. 16, 2021, the content of each of which is hereby incorporated by reference in its entirety.

TECHNICAL FIELD

The present disclosure relates to the field of touch display technology, and in particular to a touch display substrate, a method for manufacturing a touch display substrate and a touch display apparatus.

BACKGROUND

With the development of a portable electronic display apparatus, a touch panel provides a new man-machine interface which is more direct and humanized in use. The touch panel and a flat panel display panel are integrated together to form a touch display apparatus with a touch function, input may be realized through fingers, a touch pen and the like, and the operation is more visual and simple.

Currently, the common touch technology includes a resistive touch panel and a capacitive touch panel, but a user mostly selects the capacitive touch panel as the best preferred panel in consideration of controllability, usability and surface appearance. The capacitive touch panel is widely applied to various devices in electronic interaction scenes due to a high durability, a long service life and support of a multi-point touch function.

Currently, the touch display apparatus usually employs a touch electrode with a metal mesh structure, so that the touch electrode has better conductive characteristics and a higher transmittance.

SUMMARY

In order to at least partially solve the problem of crosstalk between a touch function and a display function in the existing touch display apparatus, the present disclosure provides a touch display substrate with a better product performance.

In one aspect, an embodiment of the present disclosure provides a touch display substrate, including: a base substrate; at least one touch electrode on the base substrate; the touch electrode includes: a plurality of touch signal lines extending in preset directions, and the plurality of touch signal lines form a mesh structure; display signal lines on the base substrate for providing display signals to display pixels; and second signal lines on the base substrate; the second signal lines are electrically connected to a constant potential terminal, and the second signal lines are between a layer where the plurality of touch signal lines are located and a layer where the display signal lines are located; wherein orthographic projections of the second signal lines on the base substrate at least partially overlap with orthographic projections of at least some touch signal lines on the base substrate; and/or the orthographic projections of the second signal lines on the base substrate at least partially overlap with orthographic projections of at least some display signal lines on the base substrate.

In some embodiments, there is at least a partial overlapping region between the orthographic projections of the some touch signal lines on the base substrate and the orthographic projections of the some display signal lines on the base substrate; and an orthographic projections of the second signal lines on the base substrate cover the partial overlapping region.

In some embodiments, one of the orthographic projections of the some touch signal lines on the base substrate and the orthographic projections of the some display signal lines on the base substrate is completely covered by the other one of the orthographic projections of the some touch signal lines on the base substrate and the orthographic projections of the some display signal lines on the base substrate; and the orthographic projections of the second signal lines on the base substrate cover the orthographic projections of the some display signal lines on the base substrate.

In some embodiments, a difference between a width of the display signal line and a width of the touch signal line is less than a predetermined value.

In some embodiments, the width of the display signal line is the same as the width of the touch signal line.

In some embodiments, the touch electrode includes: a plurality of first touch signal lines extending in a column direction, and a plurality of second touch signal lines extending in a row direction; and the row direction intersects with the column direction; the plurality of first touch signal lines and the plurality of second touch signal lines define the mesh structure.

In some embodiments, the display signal lines includes: first display signal lines extending in the column direction; orthographic projections of the first display signal lines on the base substrate at least partially overlap with orthographic projections of some first touch signal lines on the base substrate; and the orthographic projections of the second signal lines on the base substrate cover the orthographic projections of some first display signal lines on the base substrate.

In some embodiments, the display signal lines further includes: second display signal lines extending in the row direction; orthographic projections of the second display signal lines on the base substrate overlap with orthographic projections of some second touch lines on the base substrate; and the orthographic projections of the second signal lines on the base substrate cover the orthographic projections of some second display signal lines on the base substrate.

In another aspect, an embodiment of the present disclosure provides a touch display substrate, including: a base substrate; at least one touch electrode on the base substrate; wherein the touch electrode includes: a plurality of second touch signal lines extending in a row direction, and a plurality of first touch signal lines extending in a column direction; and the row direction intersects with the column direction; first display signal lines on the base substrate and extending in the column direction; and floating signal lines on the base substrate, extending along the row direction and insulated from the touch electrode and the first display signal lines; and orthographic projections of the floating signal lines on the base substrate overlap with orthographic projections of the first display signal lines on the base substrate, and fall within an orthographic projection of the touch electrode on the base substrate.

In some embodiments, orthographic projections of the plurality of first touch signal lines on the base substrate does not overlap with orthographic projections of the first display signal lines on the base substrate, orthographic projections of some second touch signal lines on the base substrate is between the orthographic projections of two adjacent first display signal lines on the base substrate, the some second touch signal lines connects the first touch signal lines between the two adjacent first display signal lines, the orthographic projections of the some second touch signal lines on the base substrate intersects with the orthographic projections of the first display signal lines on the base substrate, and the some second touch signal lines connects the first touch signal lines on both sides of the first display signal lines.

In some embodiments, the floating signal line is between two adjacent ones of some first touch signal lines and extends along the row direction; and the orthographic projection of the floating signal line on the base substrate intersects with the orthographic projections of the first display signal lines between the two adjacent first touch signal lines on the base substrate.

In some embodiments, at least some of the floating signal lines and the second touch signal lines are arranged in a same line.

In some embodiments, the floating signal lines extend in the column direction; and the orthographic projections of the floating signal lines on the base substrate fall within the orthographic projections of the first display signal lines on the base substrate.

In some embodiments, the floating signal lines, the plurality of first touch signal lines and the plurality of second touch signal lines are made of a same material and are in a same layer.

In some embodiments, the at least one touch electrode includes first touch electrodes and second touch electrodes; the first touch electrode includes: a first sub-portion extending in the row direction; a plurality of first fingers extending away from the first sub-portion in the column direction, and located on one side of the first sub-portion; and a plurality of second fingers extending away from the first sub-portion in the column direction, and located on the other side of the first sub-portion; the second touch electrode includes a first touch sub-electrode and a second touch sub-electrode; the first touch sub-electrode includes a second sub-portion extending in the row direction and located on the one side of the first sub-portion; and a plurality of third fingers extending from the second sub-portion toward the first sub-portion in the column direction; the second touch sub-electrode includes: a third sub-portion extending in the row direction and located on the other side of the first sub-portion; and a plurality of fourth fingers extending from the third sub-portion toward the first sub-portion in the column direction, wherein the plurality of first fingers and the plurality of third fingers are alternately arranged in the row direction, and the plurality of second fingers and the plurality of fourth fingers are alternately arranged in the row direction.

In some embodiments, the touch display substrate further includes: a bridge portion extending in the column direction and configured to electrically connect the first touch sub-portion and the second touch sub-portion; and the bridge portion is in a first electrode layer, the first touch electrodes and the second touch electrodes are in a second electrode layer, and the first electrode layer and the second electrode layer are sequentially arranged in a direction away from the base substrate.

In some embodiments, the touch display substrate further includes: display pixels on the base substrate; and an encapsulation layer on a side of the display pixels away from the base substrate and configured to encapsulate the display pixels; wherein the first electrode layer and the second electrode layer are sequentially arranged in a direction away from the encapsulation layer.

In some embodiments, one first touch electrode and one second touch electrode form one touch unit, the touch display substrate includes a plurality of touch units arranged in an array; in any two adjacent touch units along the row direction, the first sub-portions of the first touch electrodes of the two touch units are electrically connected to each other; and in any two adjacent touch units along the column direction, the second sub-portion of the first touch sub-electrode of the second touch electrode of one touch unit is electrically connected to the third sub-portion of the second touch sub-electrode of the second touch electrode of the other touch unit.

In some embodiments, the at least one touch electrode includes first touch electrodes and second touch electrodes; the first touch electrode includes: a third touch sub-electrode and a fourth touch sub-electrode symmetrically arranged along the row direction and electrically connected to each other; a width of one end of the third touch sub-electrode close to the fourth touch sub-electrode is smaller than that of one end of the third touch sub-electrode away from the fourth touch sub-electrode, and a width of one end of the fourth touch sub-electrode close to the third touch sub-electrode is smaller than that of one end of the fourth touch sub-electrode away from the third touch sub-electrode; the second touch electrode includes a first touch sub-electrode and a second touch sub-electrode symmetrically arranged along the column direction and electrically connected to each other; a width of one end of the first touch sub-electrode close to the second touch sub-electrode is smaller than that of one end of the first touch sub-electrode away from the second touch sub-electrode, and a width of one end of the second touch sub-electrode 2B2 close to the first touch sub-electrode is smaller than that of one end of the second touch sub-electrode away from the first touch sub-electrode; and in the touch electrode, the first touch electrode and the second touch electrode cross each other and are insulated from each other.

In some embodiments, one first touch electrode and one second touch electrode form one touch unit, the touch display substrate includes a plurality of touch units arranged in an array; in any two adjacent touch units along the row direction, the third touch sub-electrode of the first touch electrode of one touch unit is electrically connected to the fourth touch sub-electrode of the first touch electrode of the other touch unit; and in any two adjacent touch units along the column direction, the first touch sub-electrode of the second touch electrode of one touch unit is electrically connected to the second touch sub-electrode of the second touch electrode of the other touch unit.

In another aspect, an embodiment of the present disclosure provides a display apparatus, which includes the touch display substrate in any one of the embodiments.

In another aspect, an embodiment of the present disclosure provides a method for manufacturing a touch display substrate, which is used to manufacture the touch display substrate in any one of the embodiments, wherein the method includes: forming the display signal lines on the base substrate through a patterning process, wherein the display signal lines are used for providing the display signals for the display pixels; forming the second signal lines on the base substrate through a patterning process, wherein the second signal lines are electrically connected to the constant potential terminal; and forming the plurality of touch signal lines extending along preset directions on the base substrate through a patterning process, wherein the touch signal lines form the touch electrode of the mesh structure; wherein orthographic projections of the second signal lines on the base substrate at least partially overlap with orthographic projections of some touch signal lines on the base substrate; and/or the orthographic projections of the second signal lines on the base substrate at least partially overlap with orthographic projections of some display signal lines on the base substrate.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. In the drawings.

DETAIL DESCRIPTION OF EMBODIMENTS

Figure 1:
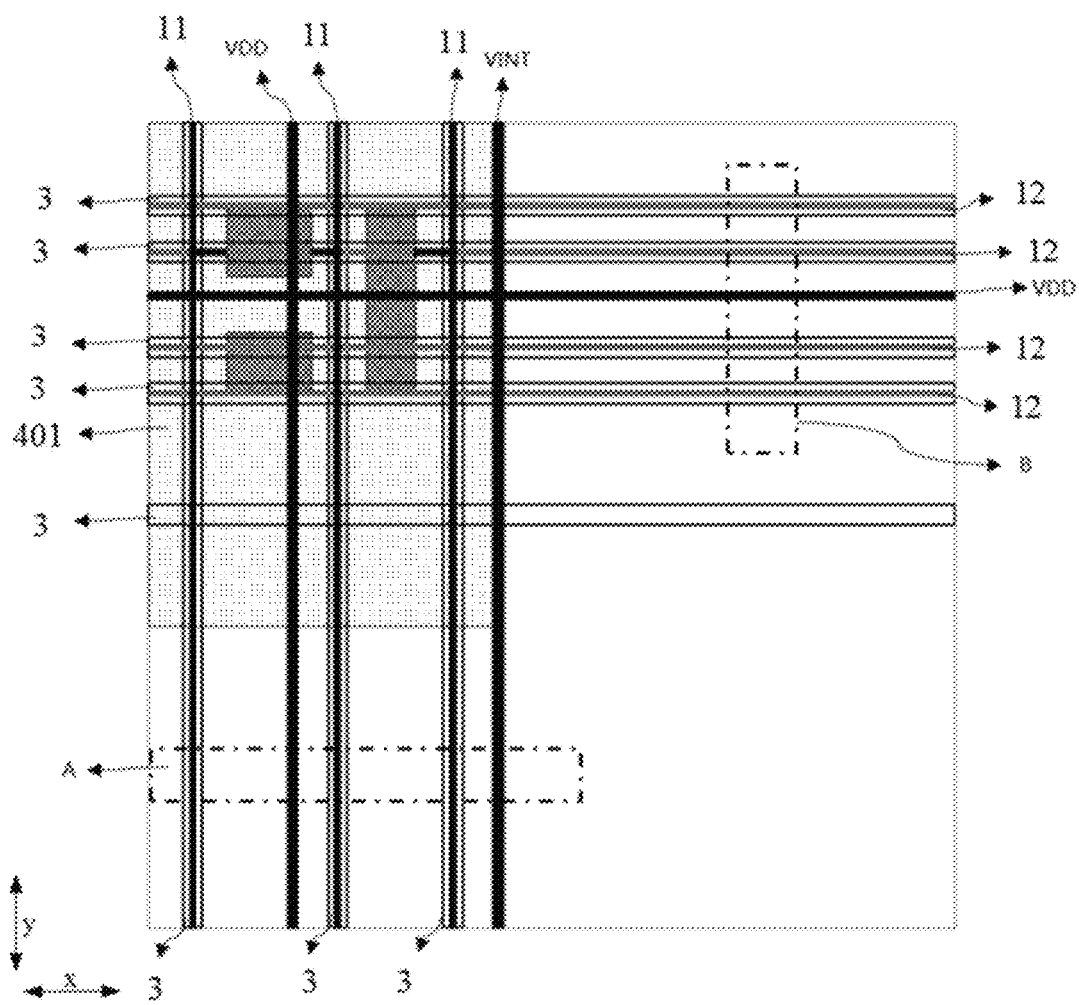
FIG. 1 is a schematic plan view illustrating a part of a structure of some layers of a touch display substrate according to an embodiment of the present disclosure.
Figure 2:
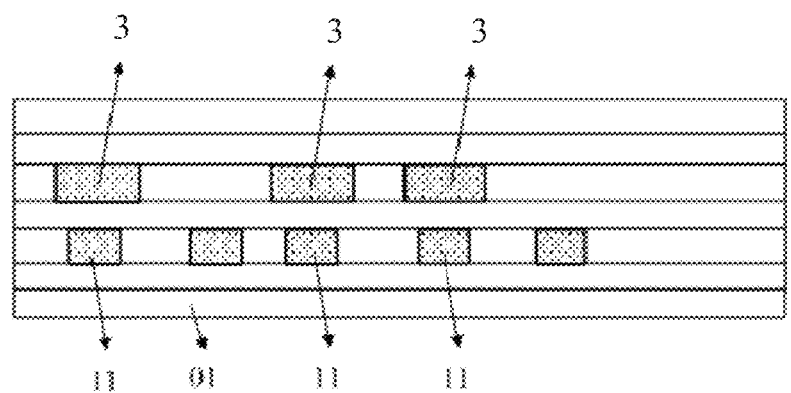
FIG. 2 is a schematic cross-sectional view of a region A in FIG. 1.
Figure 3:
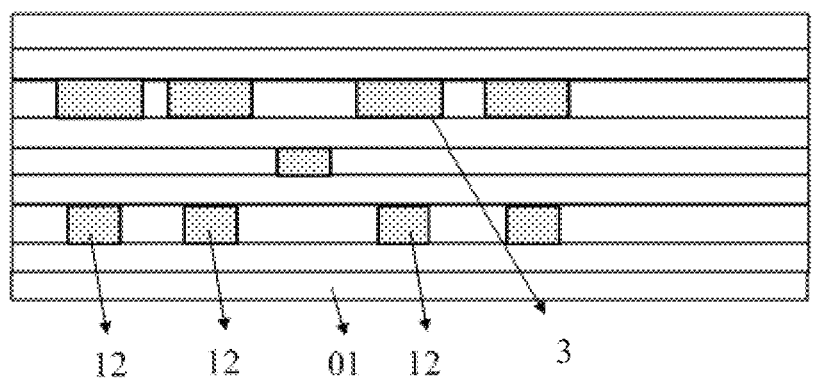
FIG. 3 is a schematic cross-sectional view of a region B in FIG. 1.

The present disclosure is described in further detail below with reference to the drawings and the embodiments. It can be understood that the specific embodiments described herein are merely illustrative of the relevant disclosure and do not limit the present disclosure. It should be further noted that for the convenience of description, only portions relevant to the present disclosure are shown in the drawings.

It should be noted that the embodiments in the present disclosure and the features of the embodiments may be combined with each other without conflict.

Furthermore, in the following detailed description, for purpose of explanation, numerous specific details are set forth in order to provide a thorough understanding of the embodiments of the present disclosure. It may be obvious, however, that one or more embodiments may be practiced without these specific details.

It will be understood that although the terms "first", "second" and the like may be used herein to describe various elements, these elements should not be limited by these terms. These terms are only used to distinguish one element from another. For example, a first element could be termed a second element, and similarly, a second element could be termed a first element, without departing from the scope of the embodiments. As used herein, the term "and/or" includes any and all combinations of one or more of the associated listed items.

It will be understood that when an element or layer is referred to as being "formed on" another element or layer, the element or layer may be directly or indirectly formed on the another element or layer. That is, for example, there may be an intervening element or layer therebetween. In contrast, when an element or layer is referred to as being "directly formed on" another element or layer, there are no intervening elements or layers therebetween. Other words (e.g., "between" "directly between", "adjacent" and "directly adjacent", etc.) used to describe the relationship between elements or layers should be interpreted in a similar manner.

The terms used herein are for the purpose of describing particular embodiments only and are not intended to limit the embodiments. As used herein, the singular form is intended to include the plural form unless the context clearly indicates otherwise. It will be further understood that the term "Including" and/or "comprising", when used herein, specifies the presence of stated features, integers, steps, operations, elements, and/or components, but do not preclude the presence or addition of one or more other features, integers, steps, operations, elements, components, and/or a combination thereof.

In this context, unless otherwise specified, the expressions "in the same layer" and "disposed in the same layer" generally mean: a first part and a second part may be made of the same material and may be formed by the same patterning process. The expressions "in different layers" and "disposed in different layers" generally mean: the first part and the second part are formed by different patterning processes.

Figure 4:
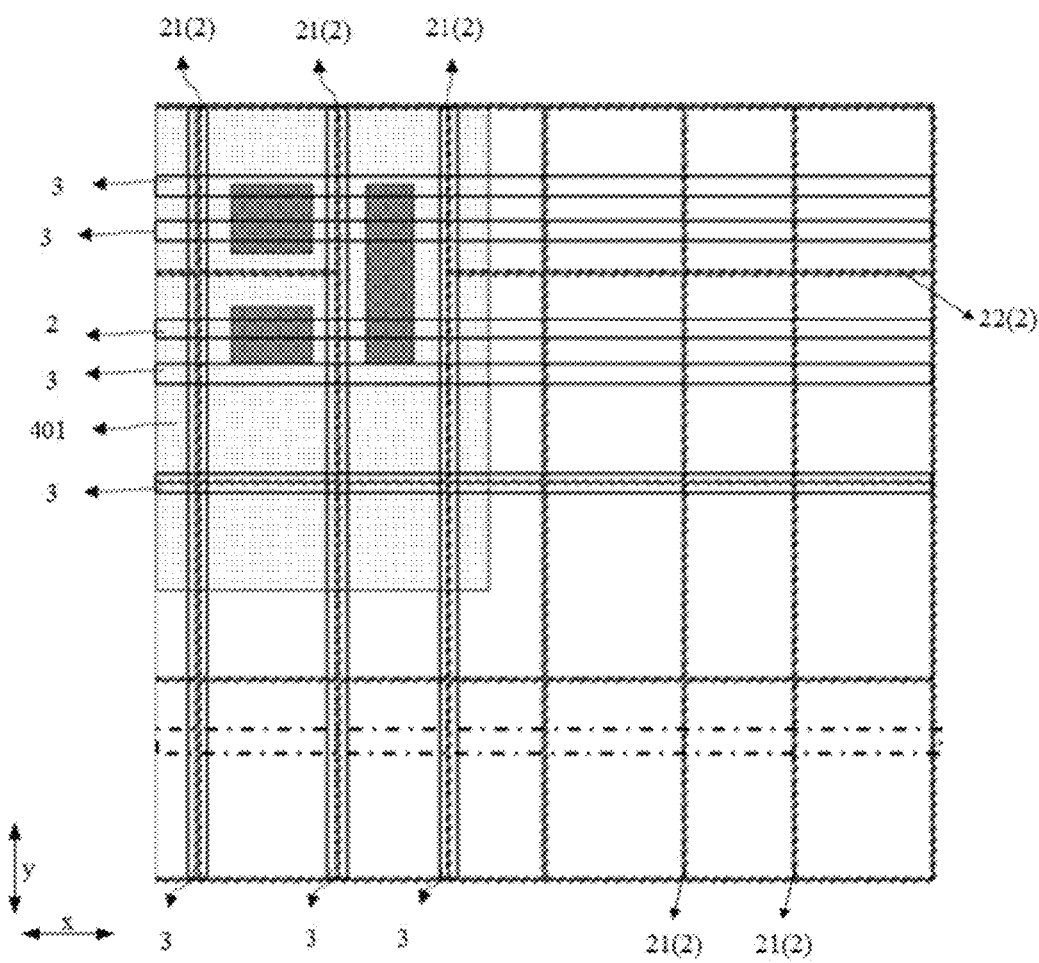
FIG. 4 is a schematic plan view illustrating a part of a structure of a touch display substrate according to an embodiment of the present disclosure.

In some embodiments, the present disclosure provides a touch display substrate. Referring to FIGS. 1 to 5, the touch display substrate includes: a base substrate 01, and a touch electrode, display signal lines, second signal lines 3 and the like on the base substrate 01. As shown in FIG. 4, the touch electrode includes: a plurality of touch signal lines 2 extending in at least two intersecting directions; the plurality of touch signal lines 2 form a mesh structure; the display signal line is electrically connected to a corresponding display pixel for providing a display signal to the display pixel; the second signal line 3 is electrically connected to a constant potential terminal; the second signal lines 3 are located between a layer where the touch signal lines 2 are located and a layer where the display signal lines are located; orthographic projections of the second signal lines 3 on the base substrate 01 at least partially overlap with orthographic projections of at least some touch signal lines on the base substrate 01; and/or the orthographic projections of the second signal lines 3 on the base substrate 01 at least partially overlap with orthographic projections of at least some display signal lines on the base substrate 01.

In the operating process of the touch display substrate, a touch signal is transmitted in the touch signal line 2, and the touch signal is generally a jumping electric signal; the display signal line is used for providing a display signal to the display pixel, and the display signal is generally a jumping electric signal. There is a small distance between the layer where the touch signal lines 2 are located and the layer where the display signal lines are located, so that the touch signal line 2 and the display signal line may be coupled to each other, and thus, the touch signal and the display signal easily interfere with each other, and the yield of the touch display substrate is reduced. Moreover, when the display substrate is applied to a vehicle-mounted transparent display window, the distance between the layer where the touch signal lines 2 are located and the layer where the display signal lines are located is closer to be about 20 μm as a thickness of the touch display substrate is reduced, so that the crosstalk between the touch signal lines 2 and the display signal lines is more obvious, and thus, the touch display substrate is prone to abnormal display, touch failure or the like.

In the touch display substrate with the mesh structure in the embodiment of the present disclosure, the second signal lines 3 electrically connected to the constant potential terminal are arranged between the touch signal lines 2 and the display signal lines. That is, a potential of the second signal lines 3 is kept constant. The touch signal lines 2 for transmitting the jump electric signals are separated from the display signal lines by the second signal lines 3, and the crosstalk between the display signals in the display signal lines and the touch signals in the touch signal lines 2 is reduced by the constant electric signal in the second signal lines 3, so that the influence of the display signal lines on the touch signal lines 2 is shielded by the second signal lines 3 in a touch stage, and the touch signal-to-noise ratio (SNR) is improved. In a display stage, the influence of the touch signal lines 2 on the display signal lines is shielded by the second signal lines 3, so that the problem that ripples easily occur in the display picture is solved.

The constant potential terminal may be grounded or connected to a negative terminal of a power supply. It can be understood that, in the conventional touch display substrate, signal lines with a constant potential, such as VSS lines and VDD lines, are arranged in the related control circuit. In the embodiment of the present disclosure, on the basis of the prior art, a pattern of the VSS lines in the pixel circuit of the existing touch display substrate may be adjusted such that the VSS lines are arranged between the display signal lines and a touch signal line layer in the current application, so as to shield the coupling influence between the display signals and the touch signals, and avoid adding of an additional structure, thereby eliminating the production cost of the touch display substrate.

Embodiments of the present disclosure provide a touch display substrate, such as a touch display substrate including an on-cell electrode. Referring to FIGS. 1 to 8, the touch display substrate includes a base substrate 01 and a plurality of touch units TU disposed on the base substrate 01 and arranged in an array to form a touch unit array. The touch unit array may be an m*n array, where m and n may be equal or unequal.

Referring to FIG. 4, in some embodiments, the touch electrode includes: a plurality of first touch signal lines 21 extending in a column direction (e.g., a Y direction in the figure), a plurality of second touch signal lines 22 extending in a row direction (e.g., an X direction in the figure); the row direction intersects with the column direction; the first touch signal lines 21 and the second touch signal lines 22 define the mesh structure. In the present disclosure, the touch signal lines 2 form the touch electrode of the mesh structure. In a single touch electrode, the plurality of first touch signal lines 21 are arranged in the row direction and extend in the column direction, and the plurality of first touch signal lines 21 are connected to each other by the second touch signal lines 22 extending in the row direction. That is, the first touch signal lines 21 cross the second touch signal lines 22, so as to form the touch electrode with the mesh structure. It should be noted that in the present disclosure, the touch electrode is of the mesh structure, which does not affect a shape of an overall pattern of the touch electrode. According to an outer contour of the overall pattern of the touch electrode, the touch electrode may have various shapes such as a strip-shaped touch electrode, a diamond-shaped touch electrode or the like.

The touch display substrate provided by the embodiment of the present disclosure further includes a display pixel layer, such as an OLED display electrode layer, an encapsulation layer or the like, between the base substrate and the touch unit array, so that the touch display substrate including an on-cell electrode is formed. A plurality of display pixels in the display pixel layer are arranged in an array, which may be a p*q array, where p and q may be equal or unequal.

In the embodiment of the present disclosure, a mesh-shaped cathode layer is further provided, and includes a plurality of first cathode patterns 401 and a plurality of second cathode patterns (not shown), the plurality of first cathode patterns 401 are distributed in an array, and any two adjacent first cathode patterns 401 are coupled to each other by at least one second cathode pattern. Referring to FIG. 4, an orthographic projection of the first cathode pattern 401 on the base substrate covers a pixel opening region in the corresponding display pixel unit.

Illustratively, each display sub-pixel includes a pixel opening region. The pixel opening region is defined by a pixel defining layer in the display substrate and is an effective light emitting region of the display sub-pixel. The display pixel unit may include a red display sub-pixel R, a green display sub-pixel G, and a blue display sub-pixel B, each display sub-pixel includes a corresponding pixel opening region, and the pixel opening regions of the display sub-pixels of different colors may have the same size or different sizes.

Figure 5:
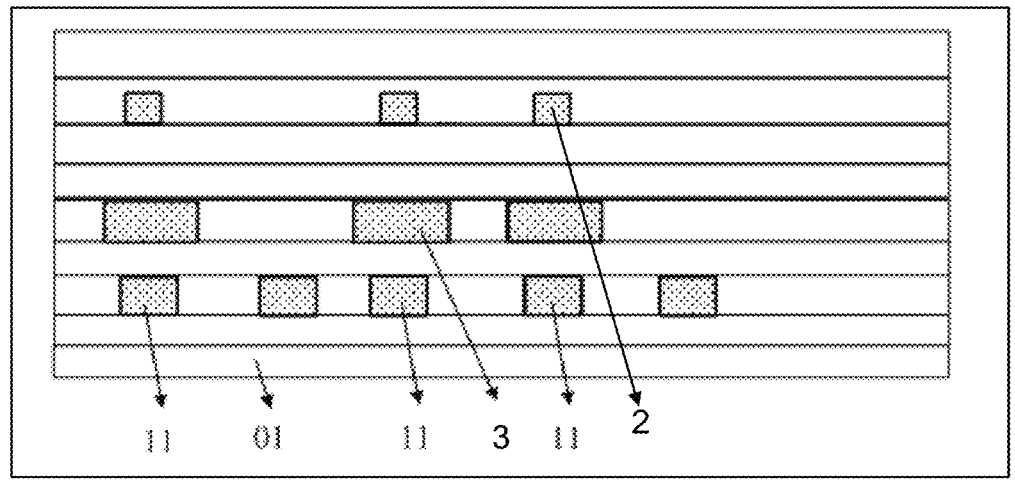
FIG. 5 is a schematic cross-sectional view of a part in the dashed frame shown in FIG. 4.

In some embodiments, referring to FIGS. 4 and 5, the orthographic projections of some touch signal lines 2 on the base substrate 01 at least partially overlap with the orthographic projections of at least some display signal lines on the base substrate 01 to form an overlapping region therebetween; the orthographic projection of the second signal lines 3 on the base substrate 01 at least covers the overlapping region. When there is the overlapping region between the orthographic projections of the touch signal lines 2 and the display signal lines on the base substrate 01, the crosstalk between the touch signals transmitted in the touch signal lines 2 and the display signals transmitted in the display signal lines is relatively obvious. In the present disclosure, the orthographic projection of the second signal lines 3 on the base substrate 01 at least cover the overlapping region between the display signal lines and the touch signal lines 2, so as to effectively shield the signal crosstalk between the display signal lines and the touch signal lines 2.

In some embodiments, at least in a width direction, one of the orthographic projections of some touch signal lines 2 on the base substrate 01 and the orthographic projections of some display signal lines on the base substrate 01 is completely covered by the other one of the orthographic projections of some touch signal lines 2 on the base substrate 01 and the orthographic projections of some display signal lines on the base substrate 01; the orthographic projections of the second signal lines 3 on the base substrate 01 cover the orthographic projections of some display signal lines on the base substrate 01. It is understood that, the width direction of the touch signal line should be perpendicular to the extending direction of the touch signal line. For example, the width direction of the touch signal line 2 extending in the row direction may be the column direction. According to a relationship between widths of the touch signal line 2 and the display signal line, the orthographic projection of one of the touch signal line 2 and the display signal line on the base substrate 01 may completely cover the orthographic projection of the other one of the touch signal line 2 and the display signal line on the base substrate 01. Specifically, the orthographic projection of the touch signal line 2 on the base substrate 01 may cover the orthographic projection of the display signal line on the base substrate 01, or the orthographic projection of the display signal line on the base substrate 01 may cover the orthographic projection of the touch signal line 2 on the base substrate 01.

In some embodiments, referring to FIG. 5, in the width direction, the orthographic projection of the second signal line 3 on the base substrate 01 may cover the orthographic projection of the display signal line on the base substrate 01 and/or the orthographic projection of the touch signal line 2 on the base substrate 01. That is, a width of the second signal line 3 is larger than that of the display signal line; and/or that of the touch signal line. As the second signal line 3 has a larger width, the second signal line 3 can isolate the interference between the display signal line and the touch signal line 2 in a larger range.

In some embodiments, a difference between the width of the display signal line and the width of the touch signal line 2 is less than a predetermined value. The display signal line is used for transmitting a display signal for the touch display substrate, and the touch signal line 2 is used for transmitting a touch signal. Generally, the display signal line and the touch signal line 2 each are a conductive line. In a transparent display, in order to ensure the light transmittance of the touch display substrate, each of the widths of the display signal line and the touch signal line 2 should be within a certain range.

Further, in some embodiments, the width of the display signal line is equal to the width of the touch signal line 2. Specifically, the width of the display signal line may be 3 μm. The width of the touch signal line 2 may be 3 μm.

In some embodiments, the width of the second signal line may be equal to the width of the display signal line and the width of the touch signal line 2, and the width of the second signal line is 3 μm. In other examples, the width of the second signal line 3 may be wider than the width of the display signal line and the width of the touch signal line 2. For example, the width of the second signal line is 6 μm.

Any numerical value in the embodiments of the present application is not strictly limited. For example, for a numerical value of 3 μm, a numerical value within a range of a measurement error and a process error, e.g., in a range from 2.5 μm to 3.5 μm, may be possible.

Referring to FIGS. 1 to 5, in some embodiments, the display signal lines include: first display signal lines 11 extending in the column direction; the touch electrode includes: first touch signal lines 21 extending in the column direction; orthographic projections of the first display signal lines 11 on the base substrate 01 overlap with orthographic projections of some first touch signal lines 21 on the base substrate 01; the orthographic projections of the second signal lines 3 on the base substrate 01 cover the orthographic projections of some first display signal lines 11 on the base substrate 01.

The first display signal lines 11 may include data lines, etc., which may extend along the column direction of a display pixel array, and at least one first display signal line 11 is connected to the display sub-pixels in a column of display pixels to provide the display data signals for the display sub-pixels. The colors of the display sub-pixels connected to the display signal line may be the same. An extending direction of the first touch signal line 21 of the touch electrode is substantially the same as or partially the same as that of the first display signal line 11, or both of the extending directions of the first touch signal line and the first display signal line 11 have the same profile. The first touch signal lines 21 and the first display signal lines 11 are provided in different layers and are insulated from each other. In order to achieve lightness and thinness of the touch display substrate, a thickness of an insulating layer between the layer where the first touch signal lines 21 are located and the layer where the first display signal lines 11 are located is relatively small, and both the touch signals in the first touch signal lines 21 and the display data signals in the first display signal lines 11 are jump signals, so that crosstalk easily occur between the two signals, and the touch effect and the display effect are both affected. In this embodiment, the second signal lines 3 with a constant potential are disposed between the first touch signal lines 21 and the first display signal lines 11, and the second signal lines 3 are used to isolate the coupling between the first touch signal lines 21 and the first display signal lines 11, so as to reduce the influence between touch and display as much as possible, thereby improving the overall performance of the touch display substrate.

Referring to FIGS. 1 to 5, in some embodiments, the display signal lines further include: second display signal lines 12 extending in the row direction; the touch electrode further includes: second touch signal lines 22 extending in the row direction; orthographic projections of the second display signal lines 12 on the base substrate 01 overlap with orthographic projections of some second touch lines on the base substrate 01; the orthographic projections of the second signal lines 3 on the base substrate 01 cover the orthographic projections of some second display signal lines 12 on the base substrate 01.

The second display signal line 12 may include a gate line, a reset signal line, a bias voltage line, a light emitting control line, or any other line for transmitting a jumping electrical signal. Preferably, the second display signal line 12 includes the gate line. The data line and the gate line are main signal lines for providing driving display signals for the display sub-pixel, and a gate voltage signal and a data voltage signal directly influence display of the display sub-pixel. In the embodiment of the present disclosure, the second signal lines may be disposed between signal lines such as the gate lines and the data lines and the touch signal lines 2, so as to shield the mutual influence between the display signals and the touch signals, and improve the overall product performance of the touch display substrate.

Each touch unit TIU includes a first touch electrode 2A and a second touch electrode 2B. The first touch electrode 2A and the second touch electrode 2B each have a metal mesh structure, and are electrically insulated from each other. One of the first touch electrode 2A and the second touch electrode 2B may be a driving electrode, and the other may be a sensing electrode.

Figure 6:
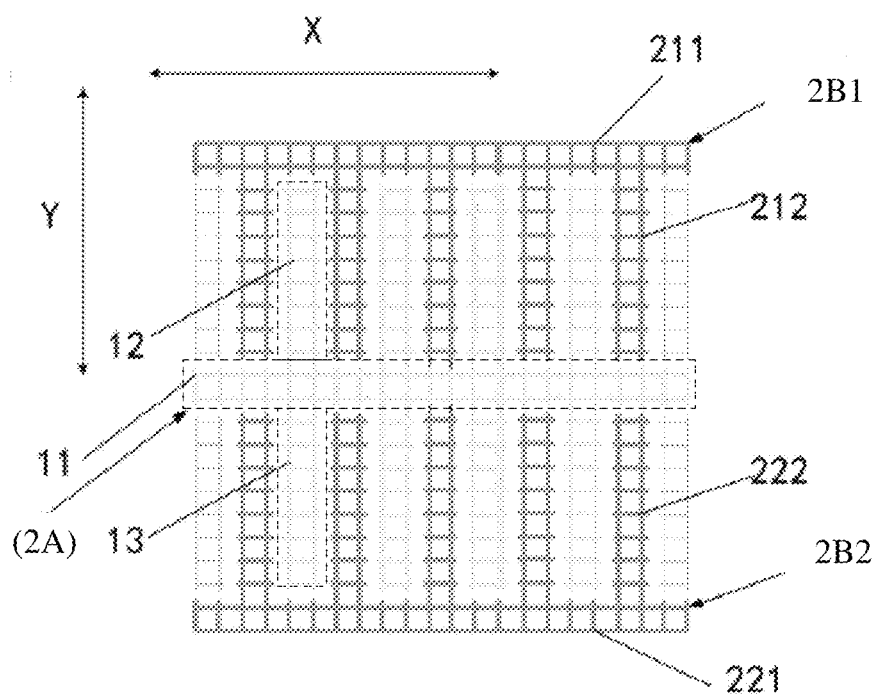
FIG. 6 is a schematic diagram of a touch electrode according to an embodiment of the present disclosure.

In some embodiments, as shown in FIG. 6, the touch electrodes include: the first touch electrode 2A and the second touch electrode 2B; the first touch electrode 2A includes: a first sub-portion 11 extending in the row direction; first fingers 12 extending away from the first sub-portion 11 in the column direction intersecting with the row direction, and the first fingers 12 are located on one side of the first sub-portion 11; the second fingers 13 extending away from the first sub-portion 11 in the column direction, and the second fingers 13 are located on the other side of the first sub-portion 11; the second touch electrode 2B includes a first touch sub-electrode 2B1 and a second touch sub-electrode 2B2, the first touch sub-electrode 2B1 includes: a second sub-portion 211 extending in the row direction, the second sub-portion 211 is located on one side of the first sub-portion 11; and third fingers 212 extend from the second sub-portion 211 toward the first sub-portion 11 in the column direction; the second touch sub-electrode 2B2 includes: a third sub-portion 221 extending in the row direction, the third sub-portion 221 is located on the other side of the first sub-portion 11; and fourth fingers 222 extend from the third sub-portion 221 toward the first sub-portion 11 along the column direction, the plurality of first fingers 12 and the plurality of third fingers 212 are alternately arranged in the row direction, and the plurality of second fingers 13 and the plurality of fourth fingers 222 are alternately arranged in the row direction.

In some embodiments, referring to FIG. 6, the plurality of first fingers 12 and the plurality of third fingers 212 are alternately arranged in the row direction, and the plurality of second fingers 13 and the plurality of fourth fingers 222 are alternately arranged in the row direction.

In some embodiments, the first touch electrode 2A and the second touch electrode 2B are disposed in the same layer and made of the same material. That is, the first touch electrode 2A and the second touch electrode 2B may be formed simultaneously by the same patterning process. For example, both are made of the same metal material, such as Al, Ag, Cu or the like.

In some embodiments, the first touch electrode 2A and the second touch electrode 2B may be a single-layer metal structure, or may be a multi-layer metal structure, such as a stacked metal structure of Ti—Al—Ti.

In some embodiments, a thickness of each of the first touch electrode 2A and the second touch electrode 2B is in a range from 1 nm to 1000 nm.

Figure 7:
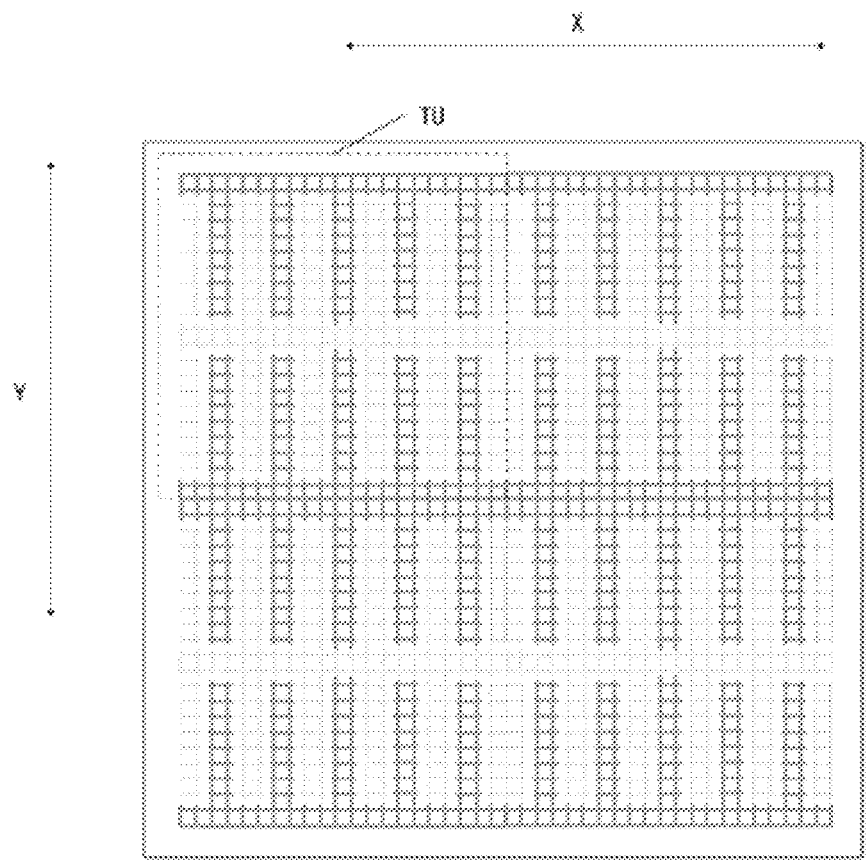
FIG. 7 is a schematic diagram of a touch display substrate according to an embodiment of the present disclosure.

In some embodiments, referring to FIGS. 6 and 7, for any two adjacent touch units TU in the row direction, the first sub-portions 11 of the first touch electrodes 2A are electrically connected to each other. For example, the first sub-portions 11 of the first touch electrodes 2A are integrally formed. For any two adjacent touch units TU in the column direction, the second sub-portion 211 of the first touch sub-electrode 2B1 of the second touch electrode 2B of one touch unit TU is electrically connected to the third sub-portion 221 of the second touch sub-electrode 2B2 of the second touch electrode 2B of the other touch unit TU. For example, the second sub-portion 211 of the first touch sub-electrode 2B1 of the second touch electrode 2B of one touch unit TU is integrally formed with the third sub-portion 221 of the second touch sub-electrode 2B2 of the second touch electrode 2B of the other touch unit TU.

The first touch electrodes 2A of the touch units TU arranged in an array form a structure of the plurality of first touch electrodes extending in the row direction, and the second touch electrodes 2B of the touch units TU arranged in an array form a structure of the plurality of second touch electrodes extending in the column direction. The structure of the first touch electrodes 2A is one of a touch driving electrode structure and a touch sensing electrode structure, and the structure of the second touch electrodes 2B is the other of the touch driving electrode structure and the touch sensing electrode structure.

In some embodiments, the touch display substrate further includes: a bridge portion extending in the column direction and configured to electrically connect the first touch sub-electrode and the second touch sub-electrode; the bridge portion is located in a first electrode layer, the first touch electrode 2A and the second touch electrode 2B are located in a second electrode layer, and the first electrode layer and the second electrode layer are sequentially provided in a direction away from the base substrate.

The bridge portion extends in the column direction and is configured to electrically connect the first touch sub-electrode 2B1 and the second touch sub-electrode 2B2. Specifically, the bridge portion is located in the first electrode layer, the first electrode layer is closer to the base substrate 01 than the second electrode layer where the first touch electrode 2A and the second touch electrode 2B are located, and an insulating layer is disposed between the second electrode layer and the first electrode layer. The bridge portion is electrically connected to the third and fourth fingers 212 and 222, respectively, which are spaced apart from each other by the first sub-portion 11 and are opposite to each other, through vias extending through the insulating layer. As can be understood by one of ordinary skill in the art, the bridge portion overlaps with lines of a complete mesh structure integrally formed by the first touch electrode 2A, the second touch electrode 2B and an optical compensation line, and does not overlap with a hollowed-out region of the complete mesh structure.

In some embodiments, the bridge portion and the first and second touch electrodes 2A and 2B are located in different layers. That is, the bridge portion and the first and second touch electrodes 2A and 2B are formed by different patterning processes, and the bridge portion may also be made of a metal material such as Al, Ag, Cu, or the like. In some embodiments, the bridge portion has a single-layer metal structure or a multi-layer metal structure, such as a stacked metal structure of Ti—Al—Ti. In some embodiments, a thickness of the bridge portion is in a range from 1 nm to 1000 nm.

In some embodiments, the bridge portion may include a plurality of (for example, two) metal lines extending in the column direction in parallel with each other.

Figure 8:
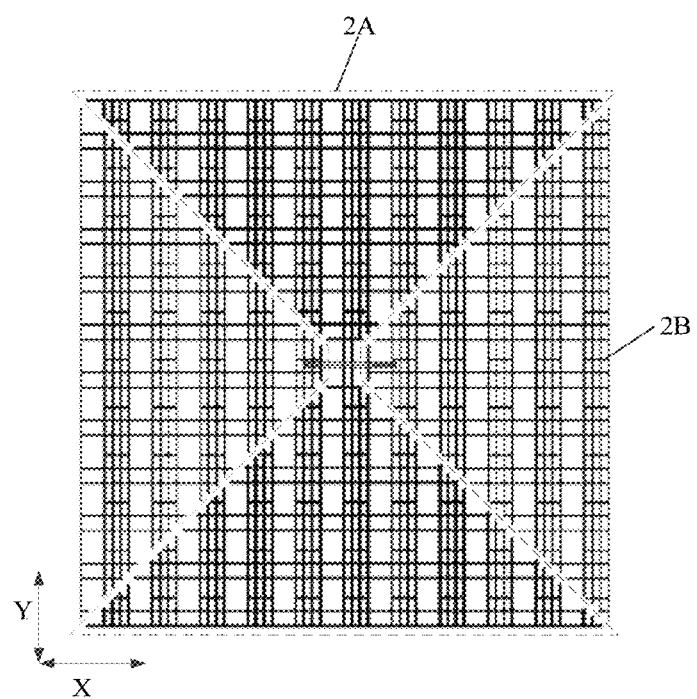
FIG. 8 is a schematic diagram of a touch display substrate according to an embodiment of the present disclosure.
Figure 9:
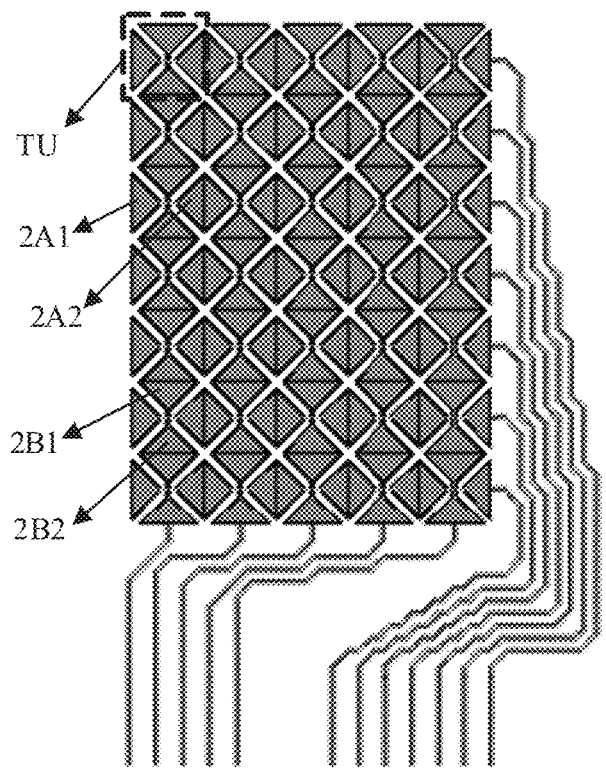
FIG. 9 is a schematic diagram of a touch display substrate according to an embodiment of the present disclosure.

In other embodiments, referring to FIGS. 8 and 9, the touch electrodes may include: first touch electrodes 2A and second touch electrodes 2B, each first touch electrode 2A includes: a third touch sub-electrode 2A1 and a fourth touch sub-electrode 2A2 symmetrically arranged along the row direction and electrically connected to each other; a width of one end of the third touch sub-electrode 2A1 close to the fourth touch sub-electrode 2A2 is smaller than that of one end of the third touch sub-electrode 2A1 away from the fourth touch sub-electrode 2A2, and a width of one end of the fourth touch sub-electrode 2A2 close to the third touch sub-electrode 2A1 is smaller than that of one end of the fourth touch sub-electrode 2A2 away from the third touch sub-electrode 2A1 Each second touch electrode 2B includes: a first touch sub-electrode 2B1 and the second touch sub-electrode 2B2 symmetrically arranged along the column direction, and electrically connected to each other. A width of one end of the first touch sub-electrode 2B1 close to the second touch sub-electrode 2B2 is smaller than that of one end of the first touch sub-electrode 2B1 away from the second touch sub-electrode 2B2, and a width of one end of the second touch sub-electrode 2B2 close to the first touch sub-electrode 2B1 is smaller than that of one end of the second touch sub-electrode 2B2 away from the first touch sub-electrode 2B1. A shape of each of the first touch sub-electrode 2B1, the second touch sub-electrode 2B2, the third touch sub-electrode 2A1 and the fourth touch sub-electrode 2A2 as a whole may be approximately an isosceles triangle. Referring to FIGS. 8 and 9, in the same touch unit TU, the first touch sub-electrode 2B1 and the second touch sub-electrode 2B2 are symmetrically arranged, the third touch sub-electrode 2A1 and the fourth touch sub-electrode 2A2 are symmetrically arranged, and the first touch sub-electrode 2B1, the second touch sub-electrode 2B2, the third touch sub-electrode 2A1 and the fourth touch sub-electrode 2A2 are arranged around a center of the touch electrode in a crossing manner.

Referring to FIGS. 8 and 9, one first touch electrode 2A and one second touch electrode 2B form one touch unit TU. The touch display substrate includes the plurality of touch units TU arranged in an array. In any two adjacent touch units TU along the row direction, the third touch sub-electrode 2A1 of the first touch electrode 2A of one touch unit TU is electrically connected to the fourth touch sub-electrode 2A2 of the first touch electrode 2A of the other touch unit TU; in any two adjacent touch units TU along the column direction, the first touch sub-electrode 2B1 of the second touch electrode 2B of one touch unit TU is electrically connected to the second touch sub-electrode 2B2 of the second touch electrode 2B of the other touch unit TU.

The first touch electrodes 2A of the plurality of touch units TU arranged in an array form a structure of the plurality of first touch electrode 2A extending along the row direction, and the second touch electrodes 2B of the plurality of touch units TIU arranged in an array form a structure of the plurality of second touch electrode 2B extending along the column direction. The structure of the first touch electrodes 2A is one of the touch driving electrode structure and the touch sensing electrode structure, and the structure of the second touch electrodes 2B is the other of the touch driving electrode structure and the touch sensing electrode structure.

The first touch electrode 2A and the second touch electrode 2B are disposed adjacently. For example, as shown in FIG. 9, two sides of the third touch sub-electrode 2A1 of the first touch electrode 2A are respectively adjacent to the first touch sub-electrode 2B1 and the second touch sub-electrode 2B2 of the second touch electrode 2B; two sides of the fourth touch sub-electrode 2A2 of the first touch electrode 2A are respectively adjacent to the first touch sub-electrode 2B1 and the second touch sub-electrode 2B2 of the second touch electrode 2B.

In another aspect, an embodiment of the present disclosure provides a touch display substrate, including: a base substrate and a touch electrode arranged on the base substrate. The touch display substrate provided in this embodiment has a similar structure to the touch display substrate provided in the previous embodiments. Specifically, the touch electrode includes: a plurality of second touch signal lines 22 extending in the row direction, and a plurality of first touch signal lines 21 extending in the column direction; the row direction intersects with the column direction; display signal lines disposed on the base substrate and extending in the column direction. Particularly, in the embodiment of the present disclosure, the touch display substrate further includes: floating signal lines 5 arranged on the base substrate, and insulated from the touch electrode and the display signal lines. An orthographic projection of the floating signal line on the base substrate overlaps with orthographic projections of the display signal lines on the base substrate, and falls within an orthographic projection of the touch electrode on the base substrate.

In the touch display substrate provided by the embodiment of the present disclosure, the floating signal lines are arranged in the touch display substrate, for shielding the display signals transmitted in the display signal lines, so that mutual interference between the touch signals and the display signals can be reduced, a touch signal-to-noise ratio of a touch layer can be effectively increased, the distortion of the touch signals can be avoided, the touch performance can be improved, and the picture display effect of a touch display apparatus can be improved.

In some embodiments, orthographic projections of the first touch signal lines 21 on the base substrate do not overlap with orthographic projections of the first display signal lines 11 on the base substrate. Orthographic projections of some second touch signal lines 22 on the base substrate are located between the orthographic projections of two adjacent first display signal lines 11 on the base substrate, and these second touch signal lines 22 connect the first touch signal lines 21 located between the two adjacent first display signal lines 11. The orthographic projections of some second touch signal lines 22 on the base substrate intersect with the orthographic projection of the first display signal line 11 on the base substrate and these second touch signal lines 22 connect the first touch signal lines 21 located on both sides of the first display signal line 11.

Figure 10:
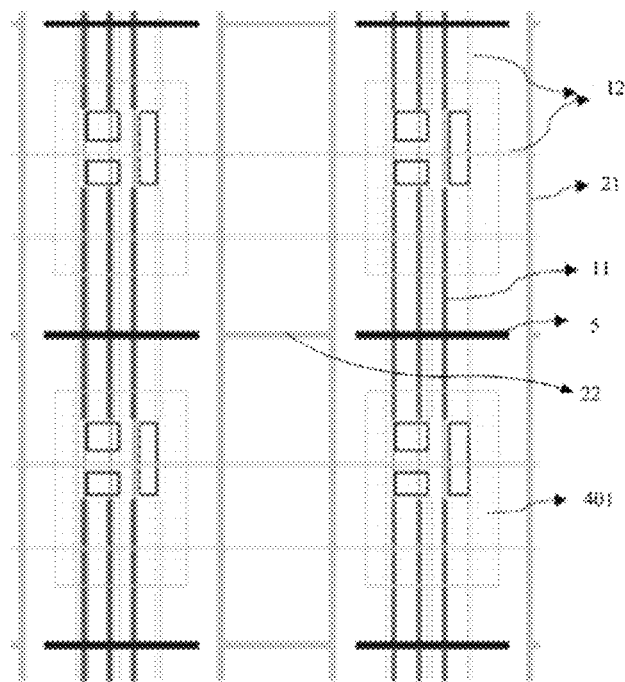
FIG. 10 is a schematic plan view illustrating a part of a structure of a touch display substrate according to an embodiment of the present disclosure.

Referring to FIG. 10, in the present disclosure, the first touch signal lines 21 extend along the column direction and may be located between some adjacent first display signal lines 11, respectively, and the orthographic projections of the first touch signal lines 21 on the base substrate do not overlap with the orthographic projections of the first display signal lines 11 on the base substrate. That is, in the embodiment, the first touch signal lines 21 and the first display signal lines 11 are arranged to be separated from each other, so that mutual interference between the touch signals transmitted in the first touch signal lines 21 and the display signals transmitted in the first display signal lines 11 is reduced, thereby effectively improving the touch signal-to-noise ratio of the touch layer, avoiding distortion of the touch signal, improving the touch performance, and improving the picture display effect of the touch display apparatus.

Figure 11:
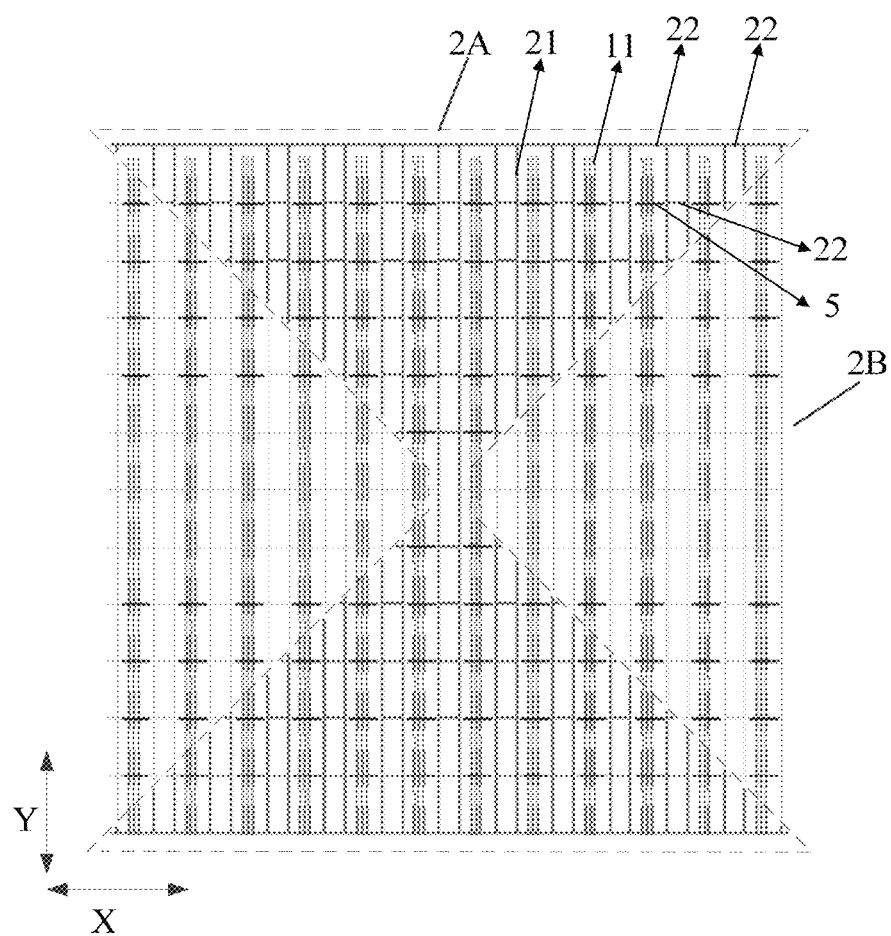
FIG. 11 is a schematic diagram of a touch unit according to an embodiment of the present disclosure.

Referring to FIG. 11, there is a space region among two adjacent first display signal lines 11, one or more first touch signal lines 21 may be disposed in the space region, and the first touch signal lines 21 located between the two adjacent first display signal lines 11 (i.e., located in the same space region) may be connected to each other through the second touch signal lines 22. The first touch signal lines 21 located in different space regions may be connected to each other through the second touch signal lines 22. The orthographic projections of the second touch signal lines 22 for connecting the first touch signal lines 21 in the same space region on the base substrate do not overlap with the orthographic projections of the first display signal lines 11 on the base substrate, and the orthographic projections of the second touch signal lines 22 for electrically connecting the first touch signal lines 21 in different space regions on the base substrate overlap with the orthographic projections of the first display signal lines 11 on the base substrate.

In some embodiments, each floating signal line is located between two adjacent ones of some first touch signal lines 21 and extends along the row direction; the orthographic projection of the floating signal line on the base substrate intersects with the orthographic projections of the first display signal lines 11 between the two adjacent first touch signal lines 21 on the base substrate.

Referring to FIG. 11, in some embodiments, at least some floating signal lines 5 are arranged in a same line with the second touch signal lines 22. In the embodiment of the present disclosure, the floating signal lines 5 are located on the same straight line as the second touch signal lines 22. The second touch signal lines 22 connect the plurality of first touch signal lines 21, so that the potentials of the same touch electrode are kept consistent. However, the same second touch signal line 22 does not necessarily penetrate through the touch electrode, and the first touch signal lines 21 may be connected to each other through the plurality of different second touch signal lines 22. It can be understood that the second touch signal lines 22 and the first touch signal lines 21 have different extending directions, so that when the second touch signal lines 22 are connected to the first touch signal lines 21, the orthographic projections of the second touch signal lines on the base substrate 01 may overlap with the orthographic projections of the first display signal lines 11 on the base substrate 01. In the embodiment of the present disclosure, extended segments of some second touch signal lines overlapping with the first display signal lines 11 are cut off at positions where the floating signal lines 5 are provided for reducing a coupling capacitance between the touch electrode and the display signal lines, reducing the mutual interference between the display signals and the touch signals, and improving the display effect and the touch performance. In other words, in the embodiment of the present disclosure, some signal lines extending along the column direction may be divided into multiple segments, and some segments of the signal lines are used as the second touch signal lines 22 and connected to the first touch signal lines 21, so as to achieve electrical connection of the touch signal lines in the same touch electrode; some segments of the signal lines are arranged to be floating and used as the floating signal lines 5 for reducing the signal interference of the touch electrode to the display signal lines in the prior art.

It should be noted that, in the embodiment of the present disclosure, some floating signal lines 5 and the second touch signal lines 22 are arranged in the same line. Alternatively, the floating signal line and the second touch signal lines 22 may not be arranged in the same line. Specifically, the plurality of first touch signal lines 21 may be electrically connected to each other through the plurality of second touch signal lines 22, and any two adjacent first touch signal lines 21 may be connected to each other through one or more second touch signal lines 22. Meanwhile, the second touch signal lines 22 connecting the plurality of first touch signal lines 21 may or may not be arranged in the same line. The second touch signal lines 22 and the floating signal lines 5 may be set according to actual requirements, with reference to requirements for the touch electrodes and requirements for the signal shielding and the crosstalk. It can be understood that when the floating signal lines 5 and the second touch signal lines 22 are arranged in the same line, the touch electrode of the mesh structure provided in the embodiment of the present disclosure does not necessarily have a strictly uniform mesh pattern, but may alternatively be the mesh pattern formed by various different meshes formed by connecting the plurality of first touch signal lines 21 and the plurality of second touch signal lines 22 in a staggered manner, and details thereof are not described in the embodiment of the present disclosure.

In some examples, the first touch signal lines 21, the second touch signal lines 22, and the floating signal lines 5 are formed of the same material and disposed in the same layer.

The floating signal lines 5, the first touch signal lines 21 and the second touch signal lines 22 may be formed in the same layer and be made of the same material. That is, the floating signal lines 5, the first touch electrodes 2A and the second touch electrodes 2B may be formed simultaneously by a single patterning process, or the floating signal lines 5 may be formed by a separate patterning process. For example, the floating signal lines 5, the first touch electrodes 2A and the second touch electrodes 2B are made of the same metal material, such as Al, Ag, Cu or the like. In some embodiments, the floating signal lines 5 may have a single-layer metal structure or a multi-layer metal structure, such as a stacked metal structure of Ti—Al—Ti.

In some embodiments, the touch display substrate provided in this embodiment may include a plurality of touch electrodes, and the touch electrodes may include: the first touch electrodes 2A and the second touch electrodes 2B the first touch electrodes 2A and the second touch electrodes 2B each may have a metal mesh structure, and are electrically insulated from each other. One of the first touch electrode 2A and the second touch electrode 2B may be the driving electrode, and the other one may be the sensing electrode.

The specific structures and related information of the first touch electrodes 2A and the second touch electrodes 2B may refer to the related contents in the foregoing embodiments, and are not described in detail herein.

In another aspect, the present disclosure provides a display apparatus including the touch display substrate in any one of the embodiments.

Specifically, the display apparatus may be any product or component having a display function, such as a liquid crystal display panel, an organic light emitting diode (OLED) display panel, an electronic paper, a mobile phone, a tablet computer, a television, a display, a notebook computer, a digital photo frame, a navigator or the like.

Figure 12:
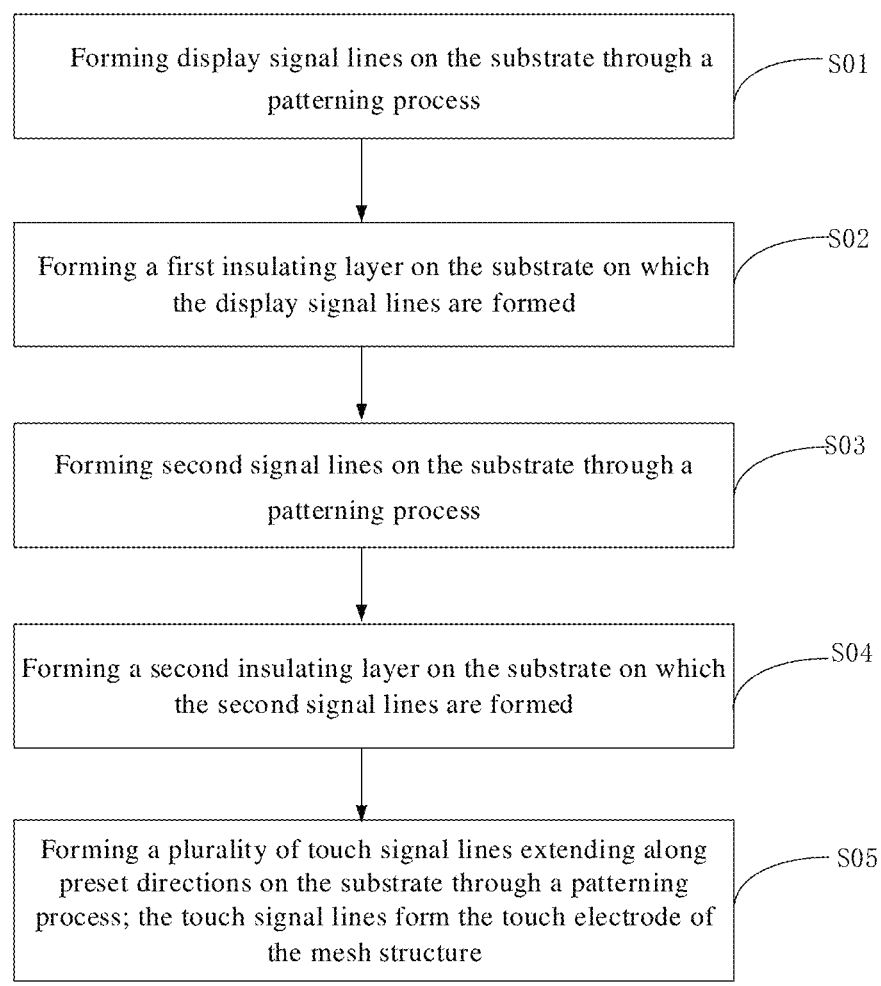
FIG. 12 is a flowchart of a method for manufacturing a touch display substrate according to an embodiment of the present disclosure.

In another aspect, referring to FIG. 12, some embodiments of the present disclosure provide a method for manufacturing a touch display substrate, which may be used to manufacture the touch display substrate provided in any one of the foregoing embodiments, and the method may include the following steps S01 to S05.

In the step S01, the display signal lines are formed on the base substrate through a patterning process, and the display signal lines are used for providing the display signals for the display pixels.

The display signal lines may include: the first display signal lines 11 extending in the column direction, the second display signal lines 12 extending in the row direction, and the like. The first display signal line 11 may include a data line, etc., which may extend along the column direction of the display pixel array. Each of the first display signal lines 11 is connected to a column of display pixels to provide the display data signals for the display pixels. The second display signal line 12 may include a gate line, a reset signal line, a bias voltage, or any other line for transmitting a jumping electrical signal.

In the step S02, a first insulating layer is formed on the base substrate on which the display signal lines are formed.

In the step S03, the second signal lines are formed on the base substrate through a patterning process, and the second signal lines are electrically connected to the constant potential terminal.

The constant potential terminal may be grounded or connected to a negative terminal of a power supply. It can be understood that in the conventional touch display substrate, signal lines with a constant potential, such as VSS lines and VDD lines, are arranged in the related control circuit. In the embodiment of the present disclosure, on the basis of the prior art, a pattern of the VSS lines in the pixel circuit of the existing touch display substrate may be adjusted such that the VSS lines are arranged between the display signal line and a touch signal line layer in the current application, so as to shield the coupling influence between the display signal and the touch signal, and avoid adding of an additional structure, thereby eliminating the production cost of the touch display substrate.

In the step S04, a second insulating layer is formed on the base substrate on which the second signal lines are formed.

In the step S05, the plurality of touch signal lines extending along preset directions are formed on the base substrate through a patterning process; the touch signal lines form the touch electrode of the mesh structure.

The touch electrode includes: the plurality of first touch signal lines 21 extending in the column direction, and the plurality of second touch signal lines 22 extending in the row direction. The first touch signal lines 21 and the second touch signal lines 22 define the mesh structure. In the present disclosure, each touch unit includes the first touch electrode 2A and the second touch electrode 2B. The first touch electrode 2A and the second touch electrode 2B each have the metal mesh structure, and are electrically insulated from each other.

The first touch electrodes 2A of the touch units arranged in an array form a structure of the plurality of first touch electrodes extending in the row direction, and the second touch electrodes 2B of the touch units arranged in an array form a structure of the plurality of second touch electrodes extending in the column direction. The structure of the first touch electrodes is one of a touch driving electrode structure and a touch sensing electrode structure, and the structure of the second touch electrodes is the other of the touch driving electrode structure and the touch sensing electrode structure.

In some embodiments, the touch display substrate further includes: a bridge portion extending in the column direction and configured to electrically connect the first touch sub-electrode and the second touch sub-electrode. The bridge portion is located in the first electrode layer, the first touch electrode 2A and the second touch electrode 2B are located in the second electrode layer, and the first electrode layer and the second electrode layer are sequentially provided in a direction away from the base substrate.

In the present disclosure, the step of forming the touch electrode may specifically include the following steps S51 to S53.

In the step S51: a first electrode material layer is formed on the base substrate, and the first electrode material layer is patterned to form the first electrode layer, which includes the bridging portion.

In the step S52: a third insulating layer is formed on the base substrate on which the first electrode layer is formed, and vias are formed in the third insulating layer through a patterning process.

In the step S53: a second electrode material layer is formed on a side of the third insulating layer away from the base substrate, and the second electrode material layer is patterned to form the second electrode layer.

The second electrode layer includes the first touch electrodes and the second touch electrodes. The first touch sub-electrode 2B1 and the second touch sub-electrode 2B2 of each second touch electrode are electrically connected to the bridge portion through the vias, respectively. The first touch electrodes and the second touch electrodes are both of metal mesh structures and are electrically insulated from each other.

In some embodiments, the method further includes forming display pixels, an encapsulation layer, a buffer layer, and the like on the base substrate at a time before forming the first electrode material layer. The display pixels are connected to the display signal lines.

In some embodiments, after the step SOI, the method further includes forming a protective layer covering the entire base substrate. The protective layer may be made of an organic or inorganic material.

It should be noted that in the present disclosure, the relational terms such as "first" "second", and the like are used only to distinguish one entity or action from another entity or action without necessarily requiring or implying any actual relationship or order between these entities or actions. Also, the term "comprising" "including" or the like is intended to cover a non-exclusive inclusion, such that a process, method, article, or apparatus that includes a list of elements includes not only these elements but also other elements not explicitly listed or inherent to the process, method, article, or apparatus. Without further limitation, an element defined by the term "comprising" or "including" does not exclude the presence of other identical elements in the process, method, article, or apparatus that includes this element.

In the above embodiments of the present disclosure, all of the details are not be set forth, and the present disclosure is not limited to the specific embodiments disclosed. Obviously, many modifications and variations are possible in light of the above description. The embodiments are chosen and described in detail in the specification in order to best explain the principles of the present disclosure and the practical applications, to enable one of ordinary skill in the art to best utilize the present disclosure and the modified use based on the present disclosure. The present disclosure is to be limited only by the claims and their full scope and equivalents.

What is claimed is:

1. A touch display substrate, comprising:
   a base substrate;
   at least one touch electrode on the base substrate; wherein the touch electrode comprises a plurality of touch signal lines extending in at least two intersecting directions, and the plurality of touch signal lines form a mesh structure;
   display signal lines on the base substrate for providing display signals to display pixels; and
   second signal lines on the base substrate; wherein the second signal lines are electrically connected to a constant potential terminal, and the second signal lines are between a layer where the plurality of touch signal lines are located and a layer where the display signal lines are located;
   wherein orthographic projections of the second signal lines on the base substrate at least partially overlap with orthographic projections of at least some touch signal lines on the base substrate; or
   orthographic projections of the second signal lines on the base substrate at least partially overlap with orthographic projections of at least some display signal lines on the base substrate;
   wherein the orthographic projections of the some touch signal lines on the base substrate at least partially overlap with the orthographic projections of the some display signal lines on the base substrate to form an overlapping region therebetween; and
   the orthographic projections of the second signal lines on the base substrate cover the overlapping region;

wherein one of the orthographic projections of the some touch signal lines on the base substrate and the orthographic projections of the some display signal lines on the base substrate is completely covered by the other one of the orthographic projections of the some touch signal lines on the base substrate and the orthographic projections of the some display signal lines on the base substrate; and the orthographic projections of the second signal lines on the base substrate cover the orthographic projections of the some display signal lines on the base substrate; and wherein a difference between a width of the display signal line and a width of the touch signal line is less than a predetermined value.

2. The touch display substrate of claim 1, wherein the width of the display signal line is equal to the width of the touch signal line.

3. The touch display substrate of claim 1, wherein the touch electrode comprises a plurality of first touch signal lines extending in a column direction, and a plurality of second touch signal lines extending in a row direction; and the row direction intersects with the column direction;

the plurality of first touch signal lines and the plurality of second touch signal lines define the mesh structure;

the display signal lines comprises first display signal lines extending in the column direction;

orthographic projections of the first display signal lines on the base substrate at least partially overlap with orthographic projections of some first touch signal lines on the base substrate; and the orthographic projections of the second signal lines on the base substrate cover the orthographic projections of some first display signal lines on the base substrate.

4. The touch display substrate of claim 3, wherein the display signal lines further comprises second display signal lines extending in the row direction;

orthographic projections of the second display signal lines on the base substrate overlap with orthographic projections of some second touch lines on the base substrate; and the orthographic projections of the second signal lines on the base substrate cover the orthographic projections of some second display signal lines on the base substrate.

5. The touch display substrate of claim 1, wherein the at least one touch electrode comprises first touch electrodes and second touch electrodes;

the first touch electrode comprises a third touch sub-electrode and a fourth touch sub-electrode symmetrically arranged along the row direction and electrically connected to each other; a width of one end of the third touch sub-electrode close to the fourth touch sub-electrode is smaller than that of one end of the third touch sub-electrode away from the fourth touch sub-electrode, and a width of one end of the fourth touch sub-electrode close to the third touch sub-electrode is smaller than that of one end of the fourth touch sub-electrode away from the third touch sub-electrode;

the second touch electrode comprises a first touch sub-electrode and a second touch sub-electrode symmetrically arranged along the column direction and electrically connected to each other; a width of one end of the first touch sub-electrode close to the second touch sub-electrode is smaller than that of one end of the first touch sub-electrode away from the second touch sub-electrode, and a width of one end of the second touch sub-electrode close to the first touch sub-electrode is smaller than that of one end of the second touch sub-electrode away from the first touch sub-electrode; and in the touch electrode, the first touch electrode and the second touch electrode cross each other and are insulated from each other.

6. The touch display substrate of claim 5, wherein one first touch electrode and one second touch electrode form one touch unit, the touch display substrate comprises a plurality of touch units arranged in an array; in any two adjacent touch units along the row direction, the third touch sub-electrode of the first touch electrode of one touch unit is electrically connected to the fourth touch sub-electrode of the first touch electrode of the other touch unit; and in any two adjacent touch units along the column direction, the first touch sub-electrode of the second touch electrode of one touch unit is electrically connected to the second touch sub-electrode of the second touch electrode of the other touch unit.

7. A display apparatus, comprising the touch display substrate of claim 1, wherein the display apparatus is a transparent touch display apparatus.

8. A method for manufacturing the touch display substrate of claim 1, wherein the method comprises:

forming the display signal lines on the base substrate through a patterning process, wherein the display signal lines are used for providing the display signals for the display pixels;

forming the second signal lines on the base substrate through a patterning process, wherein the second signal lines are electrically connected to the constant potential terminal; and forming the plurality of touch signal lines extending along preset directions on the base substrate through a patterning process, wherein the touch signal lines form the touch electrode of the mesh structure;

wherein orthographic projections of the second signal lines on the base substrate at least partially overlap with orthographic projections of some touch signal lines on the base substrate; or orthographic projections of the second signal lines on the base substrate at least partially overlap with orthographic projections of some display signal lines on the base substrate.

9. A touch display substrate, comprising:

a base substrate;

at least one touch electrode on the base substrate; wherein the touch electrode comprises a plurality of touch signal lines extending in at least two intersecting directions, and the plurality of touch signal lines form a mesh structure;

display signal lines on the base substrate for providing display signals to display pixels; and second signal lines on the base substrate; wherein the second signal lines are electrically connected to a constant potential terminal, and the second signal lines are between a layer where the plurality of touch signal lines are located and a layer where the display signal lines are located;

wherein orthographic projections of the second signal lines on the base substrate at least partially overlap with orthographic projections of at least some touch signal lines on the base substrate; or orthographic projections of the second signal lines on the base substrate at least partially overlap with orthographic projections of at least some display signal lines on the base substrate, wherein the at least one touch electrode comprises first touch electrodes and second touch electrodes;

the first touch electrode comprises:

a first sub-portion extending in the row direction;

a plurality of first fingers extending away from the first sub-portion in the column direction, and located on one side of the first sub-portion; and a plurality of second fingers extending away from the first sub-portion in the column direction, and located on the other side of the first sub-portion;

the second touch electrode comprises a first touch sub-electrode and a second touch sub-electrode;

the first touch sub-electrode comprises a second sub-portion extending in the row direction and located on the one side of the first sub-portion; and a plurality of third fingers extending from the second sub-portion toward the first sub-portion in the column direction;

the second touch sub-electrode comprises a third sub-portion extending in the row direction and located on the other side of the first sub-portion; and a plurality of fourth fingers extending from the third sub-portion toward the first sub-portion in the column direction;

wherein the plurality of first fingers and the plurality of third fingers are alternately arranged in the row direction, and the plurality of second fingers and the plurality of fourth fingers are alternately arranged in the row direction;

the touch display substrate further comprises: a bridge portion extending in the column direction and configured to electrically connect the first touch sub-electrode and the second touch sub-electrode; and the bridge portion is in a first electrode layer, the first touch electrodes and the second touch electrodes are in a second electrode layer, and the first electrode layer and the second electrode layer are sequentially arranged in a direction away from the base substrate.

10. The touch display substrate of claim 9, further comprising:

display pixels on the base substrate; and an encapsulation layer on a side of the display pixels away from the base substrate and configured to encapsulate the display pixels;

wherein the first electrode layer and the second electrode layer are sequentially arranged in a direction away from the encapsulation layer.

11. The touch display substrate of claim 9, wherein one first touch electrode and one second touch electrode form one touch unit, the touch display substrate comprises a plurality of touch units arranged in an array; in any two adjacent touch units along the row direction, the first sub-portions of the first touch electrodes of the two touch units are electrically connected to each other; and in any two adjacent touch units along the column direction, the second sub-portion of the first touch sub-electrode of the second touch electrode of one touch unit is electrically connected to the third sub-portion of the second touch sub-electrode of the second touch electrode of the other touch unit.

* * * * *